United States Patent [19]
Steiner et al.

[11] Patent Number: 4,818,402
[45] Date of Patent: Apr. 4, 1989

[54] SELF CLEANING STRAINER

[75] Inventors: Carl A. Steiner, Erie; Henry R. Jensen, Waterford, both of Pa.

[73] Assignee: TM Industrial Supply, Inc., Erie, Pa.

[21] Appl. No.: 86,022

[22] Filed: Aug. 17, 1987

[51] Int. Cl.$^4$ ............................................. B01D 29/10
[52] U.S. Cl. .................................... 210/411; 210/413; 210/452; 210/495; 210/498; 210/497.1
[58] Field of Search ................ 210/409, 457, 411–414, 210/475, 495, 494.3, 485–488, 497.1, 497.01, 452, 498, 499, 304

[56] References Cited

U.S. PATENT DOCUMENTS

| | | | |
|---|---|---|---|
| 3,256,995 | 6/1966 | Schmid et al. | 210/411 |
| 3,481,474 | 12/1969 | Paulson | 210/497.1 X |
| 3,584,685 | 6/1971 | Boyd | 210/497.1 |
| 4,328,103 | 5/1982 | Kraeling et al. | 210/411 |
| 4,348,284 | 9/1982 | Peer et al. | 210/486 |
| 4,430,232 | 2/1984 | Doucet | 210/411 X |

Primary Examiner—Charles Hart
Attorney, Agent, or Firm—Charles L. Lovercheck; Wayne L. Lovercheck; Dale R. Lovercheck

[57] ABSTRACT

A backwash strainer having a generally cylindrical filter element made up of a stack of spaced rings that are triangular in cross section, with the bases of said triangular rings disposed in a cylindrical surface. A hollow backwash arm has an open slot disposed on the inside of the cylindrical surface which operates at a predetermined distance from said element. The incoming water in said strainer flows from the inlet up through the straining element to the outlet. The backwash arm receives water from around the straining element, which flows through the element into the backwash slot and out with the debris accumulated on said strainer. Since the debris is supported on the flat interior of the rings, water flowing back into the arm into the slot in the hollow backwash arm forces trash and other debris from the rings down to the backwash water outlet. Water flowing through the clearance between the bars as used, helps flush the debris off the inside of the filter element.

11 Claims, 3 Drawing Sheets

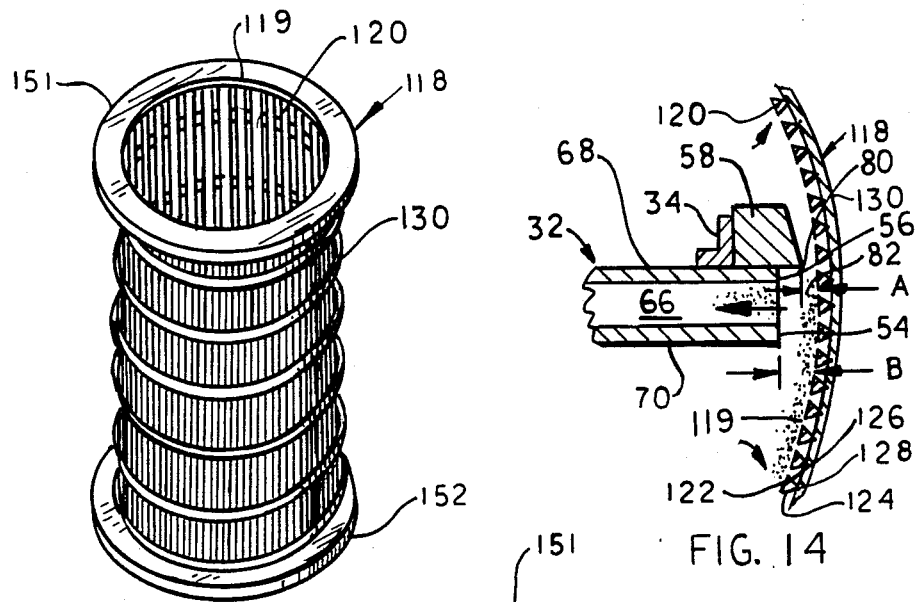
FIG. 9
FIG. 14
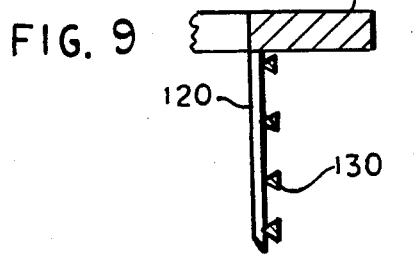
FIG. 10
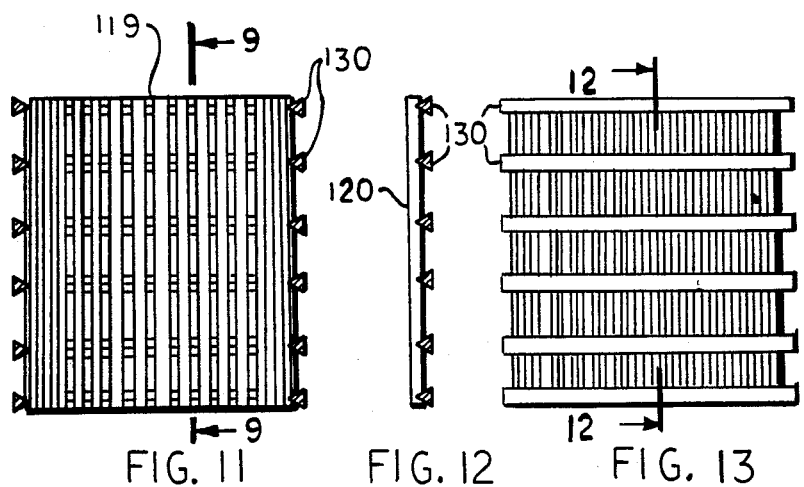
FIG. 11   FIG. 12   FIG. 13

SELF CLEANING STRAINER

FIELD OF INVENTION

Our invention relates to improvements in automatic backwashing type strainers or filters and, more particularly, to strainers for a fluid media which includes fibrous or other forms of debris which tend to mat, staple and clog the strainer element.

REFERENCE TO PRIOR ART

Fluid strainers have been employed for many years in which accumulated solids or sedimentation strained from the fluid is collected on the screening media and thereafter removed from the screening media by means of backwashing in which a portion of the fluid being strained is caused to flow in a reverse direction to clean the strainer. More recently it has been recognized that the backwashing liquid may be supplied from an external source and at a pressure above the pressure of the fluid in the strainer. Exemplary of this is U.S. Pat. No. 3,074,560.

It has also been known to provide a scraping shoe which advances over the surface of a straining member and removes surface deposits which are then accumulated and immediately backwashed through a discharge. Exemplary of such strainers in U.S. Pat. No. 2,275,958.

It is also known that a plurality of wire brushes may be employed which engage the filter plate and remove the sediment therefrom. Exemplary of such strainers is U.S. Pat. No. 3,017,029. Screens per se have been made of wire, triangular in cross section, and have been as shown in U.S. Pat. No. 4,348,284 wherein a rod is wound in the form of a helix providing a slot of continuously increasing width.

While all of the above designs have useful applications, problems arise where fibrous or other debris which tends to mat is carried in the fluid to be strained. The fibrous debris tends to mat and entangle itself on the straining media, thereby making removal by the conventional means of reverse flushing very difficult and often virtually impossible.

One such patent which recognizes the problems of fibrous debris adhering to the strainer element is U.S. Pat. No. 3,392,839. That patent teaches the use of a fine mesh strainer element in combination with other elements in the form of honeycomb grids, the action of which prevents excessive entanglement and build up of fibers in and on the fine mesh element. The honeycomb grids may conveniently be made up of an assembly of metal strips in which the ratio between the length and cross section of the apertures is such as to shield the intermediate fine mesh screen from excessive contact with the fibrous debris.

U.S. Pat. No. 3,357,566 shows a backwash filter having an inlet, a first outlet and a backwash outlet with a backwash arm having rubber edges defining a slot that engages the inside of the filter basket. The filter element basket is made up of vertically spaced rods.

U.S. Pat. No. 4,135,820 utilizes a strainer element made of a plurality of stacked spaced concentric rings, rectangular in cross-section, with perpendicularly disposed bars, spaced both inside and outside of the basket. The bars, together with the top and bottom ring define a series of compartments along the strainer element formed by the protruding surfaces of engagement with the rotating backwash supply arms. These compartments collect the debris and where the debris extends into an adjacent compartment, a shearing means causes shearing of the debris into section for eventual removal. This design of strainer element is complex and not simple and can result in undesirable pressures built up inside the strainer element.

SUMMARY OF THE INVENTION

Our design is specifically intended for improvements in strainers, straining media and backwash device on which fibrous or other debris tends to plug or clog the media making removal by conventional means virtually impossible. We further provide a screen and backwash design which is more effective than existing means and reduces the loss of valuable fluids.

We provide an automatic backwashing strainer having a fixed straining media and a rotating, backwashing device. The backwashing device of the rotary type develops high velocity liquid for backwashing. We further employ a new design for the straining media in which the straining media increases in size in the direction of flow so as to provide a smooth, flat surface to trap debris and reduce the possibility of retaining particles smaller than the screen opening.

BRIEF DESCRIPTION OF THE DRAWINGS

FIG. 9 is an isometric view of the embodiment of the invention shown in FIGS. 9 through 14.

FIG. 10 is an enlarged partial cross sectional view taken on line 9—9 of FIG. 11.

FIG. 11 is a cross sectional view of the strainer shown in the embodiment of the invention of FIGS. 9 through 14.

FIG. 12 is a partial longitudinal cross sectional view of the embodiment of the invention shown in FIGS. 9 through 14.

FIG. 13 is a side view of the strainer element shown in the embodiment of the invention of FIGS. 9 through 14.

FIG. 14 is a partial enlarged cross sectional view similar to the embodiment of the invention shown in FIG. 8.

DETAILED DESCRIPTION OF THE DRAWING

Figure 1:
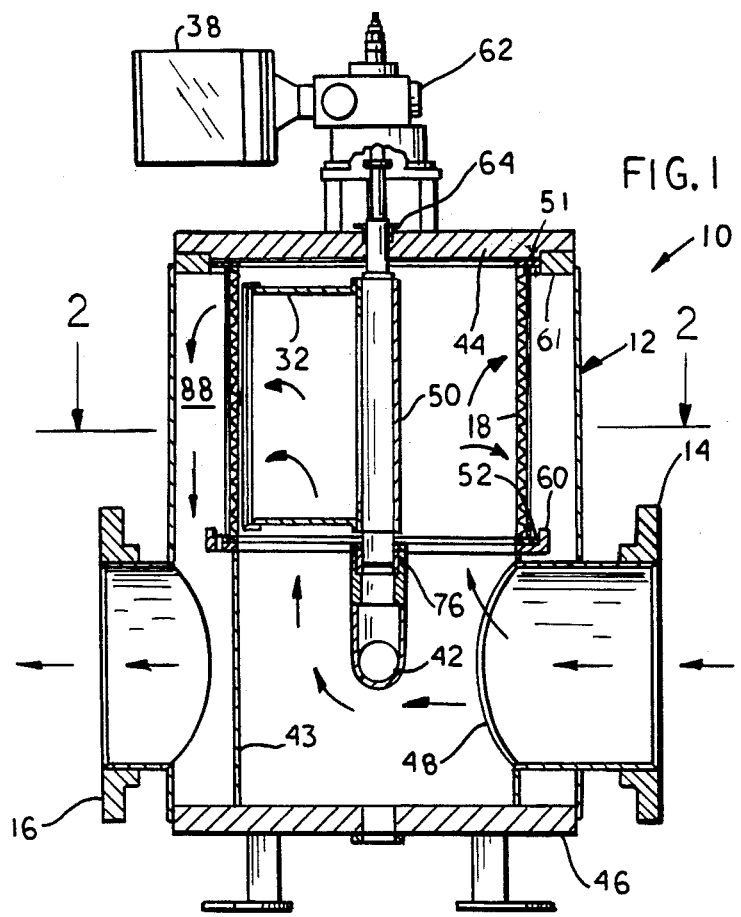
FIG. 1 is a longitudinal cross-sectional view of a strainer according to the invention.
Figure 2:
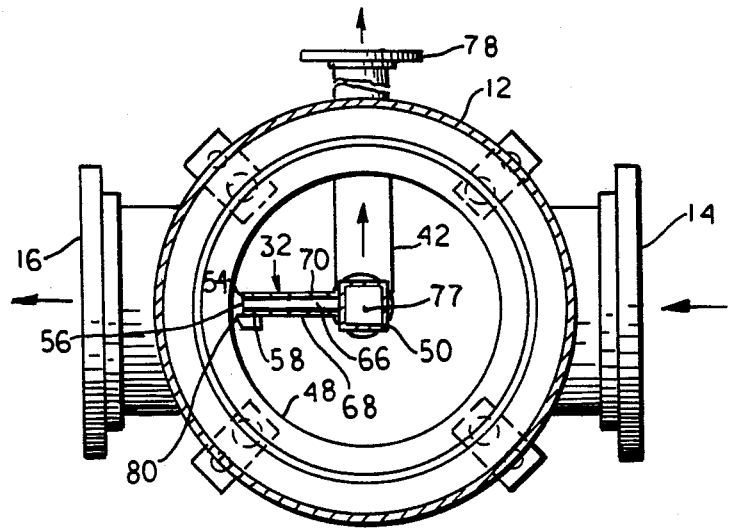
FIG. 2 is a cross-sectional view taken on line 2—2 of FIG. 1 with the strainer element removed.

Now with more particular reference to the drawings, the strainer 10 disclosed herein is made up of a body 12, which may be a generally cylindrical body, having a closed top 44 and a closed bottom 46. The body 12 has a hollow, generally cylindrical partition 43 which also functions as a support for the strainer element 18. Partition 43 is disposed concentrically in the lower part of the body 12 and rests on the closed bottom 46. Inlet tube 14 is connected through an opening 48 in the side of the partition 43. Outlet 16 extends through the outer wall of the body 12.

Strainer element 18 comprises a hollow cylindrical configuration and is concentrically disposed inside the body 12 with a space 88 between the inner walls of the body 12 and the outer surface of the strainer element 18 around the cylindrical partition. The strainer element 18 has a first ring 51 on its upper end that fits into ring 61 on the body and a second ring 52 on its lower end which rests on ring 60 on body 12.

Closed top 44 forms a closure for the upper end of the strainer element 18. The strainer element 18 rests on the ring 60 which is welded to the upper end of the cylindrical partition 43. Support ring 60 is welded to and is therefore is an integral part of the partition 43. Ring 60 is machined concentric with ring 61 to guide the strainer element 18 and support it concentric with the hollow shaft 50, offering a smooth, efficient, cleaning operation of the removal of the dirt from the strainer and extending the life of hollow bearing 76. The motor and speed reducer unit 38 is supported on the top 44 and has a gear reduction unit or other suitable drive indicated at 62, operatively connected to the hollow shaft 50 and extending through a packing 64 into the interior of the strainer element 18.

The hollow backwash shaft 50 may be square or round in cross-section and have a slot 66, which communicates with the inside of the backwash arm 32. The backwash arm 32 is made up of two spaced plates 68 and 70 which defines a slot 66, which terminates in open ends 54 and 56 defining slot 66.

The lower end of hollow backwash shaft 50 is received in the hollow bearing 76, which is supported on backwash pipe 42 and communicates with the backwash pipe 42. The backwash pipe 42 discharges through the backwash outlet 78, which may be connected to a suitable drain. A bar 58, which may be made of brass, is supported on plate 68. Bar 58 is generally rectangular in cross-section and terminates in a corner portion 80, which moves in closed spaced relation to the inside surface of the strainer element 18. Since the inside of the slot 66 is exposed to atmospheric pressure and the liquid in the space 88 is under pressure, liquid will tend to flow from space 88 back through the strainer element 18 to the inside of slot 66.

The strainer basket, shown in FIGS. 3 through 8, is made of a plurality of spaced concentric rings 20, triangular in cross section, stacked with a space of, for example, 0.003 to 0.025 inches between them. Spaced vertical rods 30 hold rings 20 in position. Plate-like end rings 51 and 52 are attached to vertical rods 30.

As an alternate, the strainer element 18 can be made with a plurality of straight bars 120, triangular in cross section, disposed vertically in closely spaced relation defining a hollow cylinder. Rings 130, in the form of circumferential hoops, may be disposed horizontally as shown in FIGS. 9 through 14. Rings 130 hold bars 120. The inside surface (base 122) of bars 120 define a hollow cylinder. The rings are triangular in cross section and have base 122 and sides 124 and 126. The adjacent sides 124 and 126 meet at apex 128 remote from the base 122. The rings 130 are disposed generally perpendicular to the rings 120 and attached to the rings 120 on the outside thereof, holding the bars 120 in spaced relation to one another. The space between the bars 120 is defined as the screen opening 119, which can vary in size from 0.003 inches to 0.250 inches and larger. Supports 151 and 152 are fixed to the ends of bars 120. The vertical bars can be spaced at any suitable distance depending on the material being handled, for example, the vertical bars can be spaced 0.003 inches to 0.250 inches from one another. The bases 122, of the generally triangular cross sections of the bars 120, are disposed with their bases 122 facing inward, and apexes facing outward, each disposed in the surface of a cylinder defining an inside surface of the strainer element 118. The apex 128 of each of the generally triangular cross sections of the rings 120 may be welded to the support bars 130.

Figure 3:
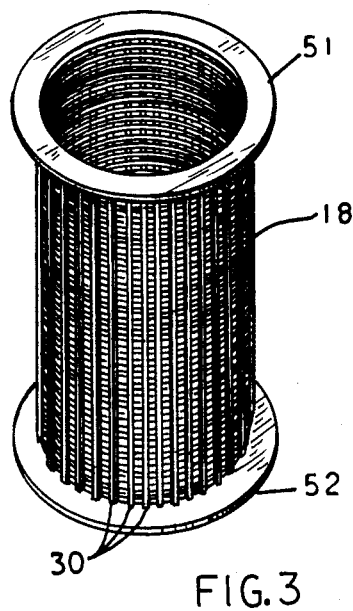
FIG. 3 is an isometric view of the strainer element according to the invention.
Figure 4:
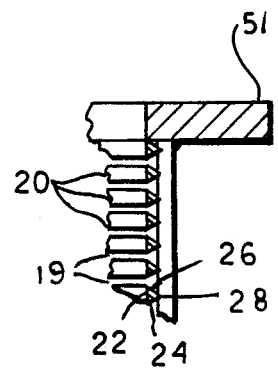
FIG. 4 is a partial enlarged longitudinal view of the strainer element shown in FIG. 3.
Figure 8:
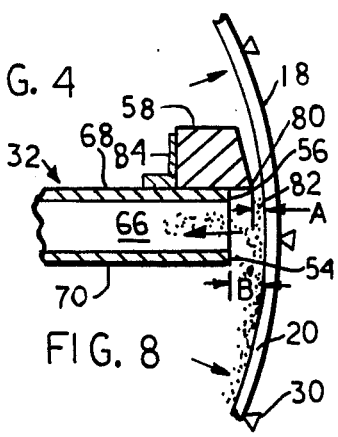
FIG. 8 is an enlarged partial cross-sectional view taken on line 2—2 of FIG. 1.
Figures 5, 6:
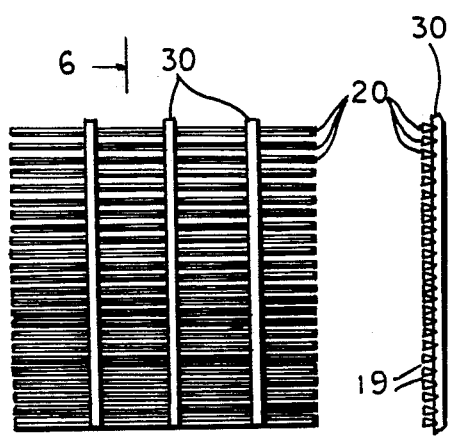
FIG. 5 is a partial side view of the strainer element.
FIG. 6 is a cross-sectional view of the strainer element taken on line 6—6 of FIG. 5.
Figure 7:
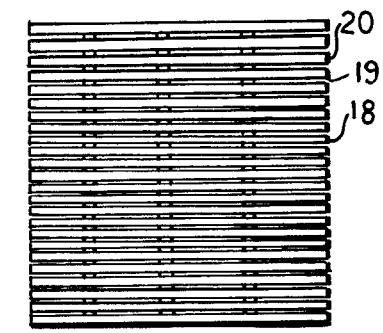
FIG. 7 is a partial view from the inside of the strainer element looking out.

The screen may be made by winding the triangular cross section wire forming rings 20 spirally around a form or the array of support rods forming a helix. The helix may be split to form rings and the rings may be welded to support rods to form the configuration as shown in FIG. 3. The rings are then rewelded if desired.

The rotating hollow shaft 50 has axle means supporting the hollow backwash arm 32 on the strainer body 12 for rotation about a central axis of the strainer element 18. The hollow backwash arm 32 extends outwardly from the hollow shaft 50. The backwash pipe 42 has a central axis 77 and terminates in close spaced relation to the inner periphery of the strainer element 18. The outer ends of the plates 68 and 70 terminate in close spaced relation to the inner periphery of the strainer element 18. The clearance A at space 82 may be on the order of 1/32 of an inch. Plate 70 has a clearance B of ⅜" to 1", depending on size, between it and the inner periphery of strainer element 18. The bar 58 is supported on bracket 84 and fixed to plate 68 by means of a suitable fastener. Bar 58 has a corner portion 80 with a very small clearance between the bar 58 and the strainer element 18.

In operation, when a supply of water to be filtered is connected to the inlet tube 14 flows through the strainer element 18 and discharges through the outlet 16 the water, filters out through the element 18 into the space 88 between the strainer element 18 and the body 12, debris from the water is left on the inside of rings 20. As the backwash arm 32 rotates, filtered water from space 88, flows back through the strainer element 18 into the slot 66 between plates 68 and 70 and carry with it the debris that has accumulated on the inner surfaces of the rings 20 or bars 120. Since the spaces between the sides 24 and 26 of adjacent rings increase in size in an outward direction and become larger than the space that is small enough to pass between the bases 20, any material between the rings will tend to be washed away with the filtered water and will not lodge between the bars. Bar 58 will break loose any debris that may lodge between rings 20.

The foregoing specification sets forth the invention in its preferred, practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. A backwash strainer comprising a cylindrical body,
a cylindrical strainer element in said body,
an annular space between said cylindrical body and said cylindrical strainer element,
an inlet in said body to said strainer element,
an outlet from said annular space, said element comprising a plurality of substantially parallel, equally spaced bars, said parallel bars defining a cylindrical surface with spaced slots between said parallel bars, support means attached to said bars holding said bars in spaced relation to one another, a hollow backwash arm having an axially extending slot defined by two spaced members having ends, said backwash arm being movable about a central axis moving said ends of said backwash arm in close spaced proximity relation to said cylindrical surface providing a space for backwash water to flow between said ends of said backwash arm and said cylindrical surface for washing foreign material from said inside surface into said backwash arm to said discharge outlet.

2. The backwash strainer recited in claim 1 wherein, said bars comprising a plurality of annular rings, said rings being generally triangular in cross-section, said generally triangular cross-sections of said rings having a relatively flat base and sides, said sides of each said ring meeting at an apex remote from said base, said support means comprising a plurality of supports disposed generally perpendicular to said rings and attached to said rings, holding said rings in spaced concentric relation to one another, said bases of each said ring being disposed generally in said cylindrical surface of said cylindrical strainer element.

3. The strainer recited in claim 1 wherein said end of one of said two spaced members has a second bar attached thereto and spaced from said cylindrical surface to engage debris on said cylindrical surface.

4. The strainer recited in claim 2 wherein said rings are parts of a spiral rod, said triangular shaped rings provide spaces for only two point particle retention that reduces the possibility of debris remaining on said strainer element after a cleaning operation, whereby the slotted space design reduces the possibility of retaining particles smaller than the screen opening, preventing premature clogging of said strainer element.

5. The strainer recited in claim 4 wherein said spiral rod is cut axially forming rings having ends and said ends are welded together.

6. The strainer recited in claim 3 wherein said strainer element is made up of a first end ring and a second end ring on its opposite end, said support bars holding said end rings in spaced relation to one another, said rings providing spaces sufficiently small to strain debris of predetermined sizes from a liquid, said triangular cross-sections of said rings having a base and two sides adjacent said base, said sides adjacent said base terminating in an apex, said apex of each said ring being fixed to said support bars, said bases of said triangular shaped circular/annular rings being disposed in a cylindrical surface.

7. The strainer recited in claim 2 wherein said strainer has motor means supported on it, said motor means being fixed to said hollow shaft.

8. The strainer recited in claim 7 wherein said hollow shaft is connected to said backwash arm.

9. The strainer recited in claim 8 wherein said rings define a cylindrical surface with axially spaced slots and, said backwash arm provides passages for filtered water to pass through said slot.

10. The strainer recited in claim 3 wherein said vertical bars are closely spaced to one another providing said inwardly facing cylindrical surface.

11. The strainer recited in claim 3 wherein said rings are closely spaced from one another providing said inwardly facing cylindrical surface.

* * * * *